Figure 11:
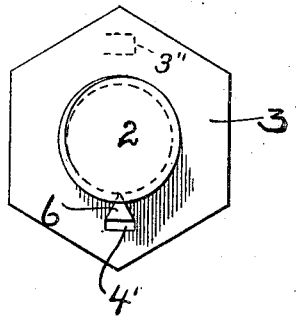

F. A. BEARD.
NUT LOCK.
APPLICATION FILED MAY 15, 1907.
922,243.
Patented May 18, 1909.
2 SHEETS—SHEET 1.
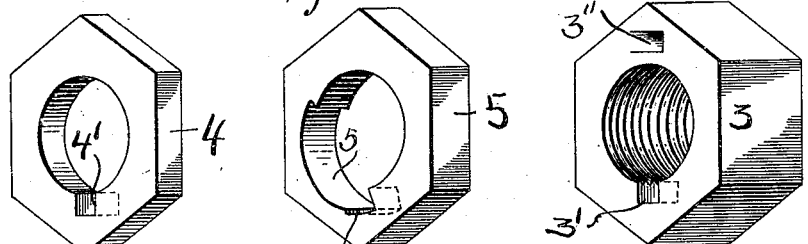
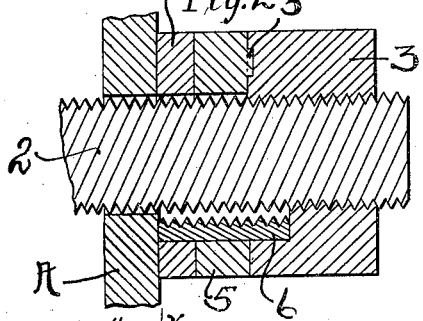
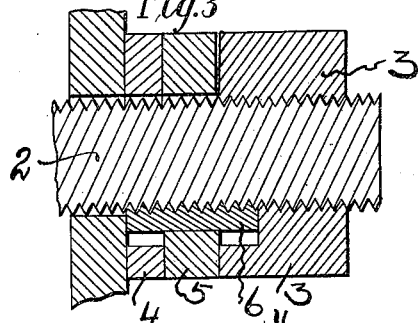
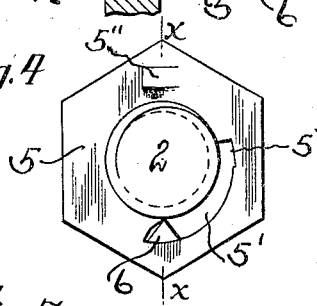
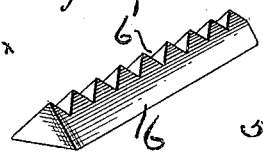
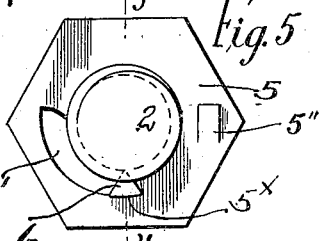
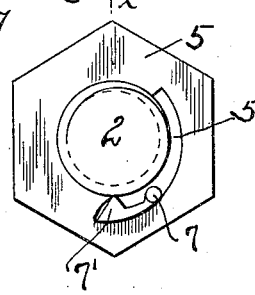
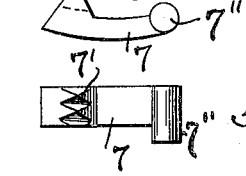
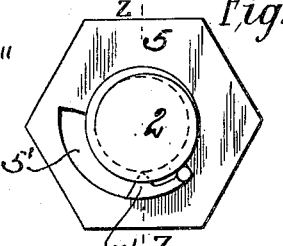
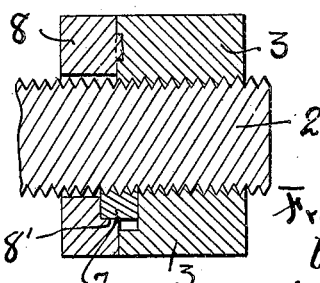
Attest:
J. Alexander Vernon
F. E. Alexander
Inventor:
Frank A. Beard
by his Atty's,
Hensey & Gough

F. A. BEARD.
NUT LOCK.
APPLICATION FILED MAY 15, 1907.

922,243.

Patented May 18, 1909.
2 SHEETS—SHEET 2.

Attest:
Jas. F. Nagle.
J. Alexander Vernon

Frank A. Beard
Inventor:
by his Atty's,
Hensey + Gough

UNITED STATES PATENT OFFICE.

FRANK A. BEARD, OF JACKSONTOWN, OHIO.

NUT-LOCK.

No. 922,243.   Specification of Letters Patent.   Patented May 18, 1909.

Application filed May 15, 1907.   Serial No. 373,764.

*To all whom it may concern:*

Be it known that I, FRANK A. BEARD, a citizen of the United States, residing at Jacksontown, in the county of Licking and State of Ohio, have invented certain new and useful Improvements in Nut-Locks, of which the following is a specification.

My invention relates to nut locks and more particularly to nut locks having means whereby a key may be forced into engagement with a bolt binding the nut thereto.

The invention consists in the construction and arrangement of parts and constructional details set forth in the appended specification, and more particularly stated in the claims.

The object of my invention is to provide a nut lock wherein the key shall be protected from moisture, shall be positively held in place for locking the nut, may be tightened at any point desired without relaxing or changing the tension of the nut, and wherein the key may be positively disengaged from the bolt by a reverse movement of the key-engaging device.

Figure 12:
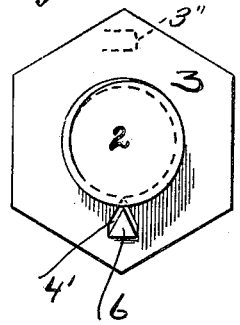
Figure 13:
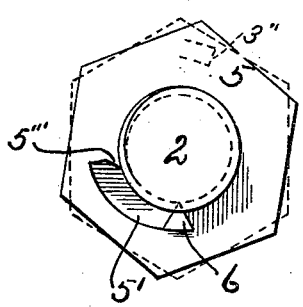
Figure 14:
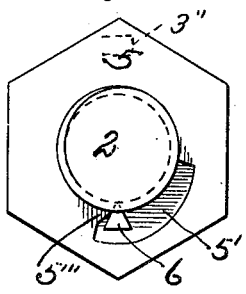
Figure 15:
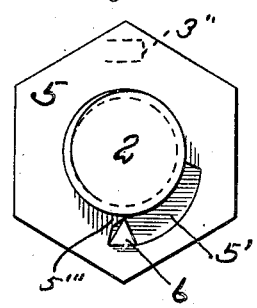
Figure 16:
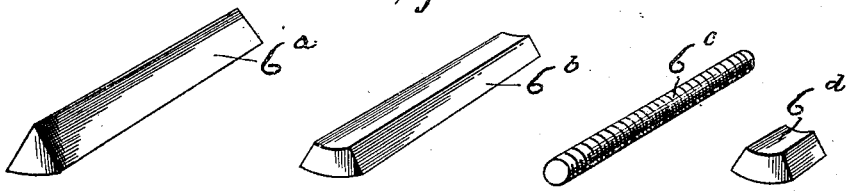
Figure 17:
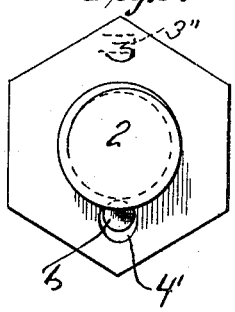

I have shown two embodiments of my invention in the drawings wherein,

Figure 1 is a perspective view of the plain washer, the cam washer and the nut proper removed from the bolt. Fig. 2 is a longitudinal section of a bolt and my nut lock, on line *x*—*x* of Fig. 4, the key being shown disengaged from the bolt. Fig. 3 is a longitudinal section on line *y*—*y* Fig. 5, the key being shown as engaged. Figs. 4 and 5 show face views of the cam washer and key in its unlocked and locked positions respectively, the nut 3 being removed. Fig. 6 is a perspective view of one form of key. Figs. 7 and 9 are face views of the cam washer in an unlocked and locked position respectively, showing a different form of key. Fig. 8 shows two views of the form of key shown in Figs. 7, 9 and 10, and Fig. 10 is a section on line *z*—*z* Fig. 9. Figs. 11 and 12 are inside face views of a nut showing the preferable form of recess to be used with triangular keys and showing respectively two different positions of the key when the same is locked and unlocked. Figs. 13, 14 and 15 show face views of the cam washer in three different positions,—when the key has been forced into engagement with the threads of the bolt, when it is still in engagement with the threads of the bolt but is being forced out of engagement, and when it is entirely out of engagement with the bolt threads. Fig. 16 shows in perspective four several forms of keys adapted to be used with my lock. Fig. 17 shows a face view of a nut having a circular recess for use with round keys.

Like characters in all the several views designate like parts.

The bolt-shank 2 is of the usual standard construction.

3 designates a nut of the regulation form except for one slight change to be later described; 4 designates a washer of the general form ordinarily used, and 5 the locking washer,—which I hereafter designate as the cam washer because of its peculiar construction and action. The nut 3 is screw-threaded on its interior as usual, and departs from the regulation form only in having the recess 3' cut out from one face adjacent to a screw-threaded interior and opening therein. This recess extends only a part of the way into the nut as will be seen in Fig. 3. The plain washer 4 is also recessed at 4' to correspond with the recess 3', the recess however extending preferably through the entire washer. While I have shown a rectangular recess in Fig. 1, I desire it to be understood that I prefer to use the form of recess shown in Figs. 11 and 12 when a triangular key is used.

As shown in Figs. 4 and 5 the cam washer has in its center a circular opening for surrounding the bolt and a recess cut out in one side of the circular opening to form a wedge-shaped slot for the reception of the key. This slot at one end is of a depth slightly greater than the depth of the key to be used and then decreased in depth as it extends around the bolt.

The key to be used with my nut lock may be of any desired construction capable of fitting in the recesses of the washer, the cam washer and the nut. It may be formed of a round or square bar but preferably I give it a triangular cross section, the apex of the triangle being toothed and the base adapted to be seated within the recesses of the nut and washers. As will be seen in Figs. 2 and 3, the key extends through the washer and the cam washer and into the nut itself. When the cam washer is so turned that that portion of its recess 5' which is of the greatest depth is in alinement with the recesses 3' and 4', then the key is out of engagement with the bolt. As the nut and washers are held by the key as a unit, the nut may be tightened up to any extent desired, or loosened after being tightened by turning all as a unit, but when it is desired to lock the nut it is only necessary to hold the nut 3 and the washer 4 from movement and turn the cam washer 5 a quarter turn or less. As this is forced around, the continually lessening depth of the cam-groove 5' forces the key inward and into engagement with the bolt. It is to be understood that the edge 6' of the key may be serrated as shown in Fig. 6 or unbroken as desired, and that in the latter case it will crush and cut into the screw-threads of the bolt, thus binding the nut firmly in place and absolutely preventing its removal so long as the cam-washer is in place.

In Fig. 16 I have shown four forms of key, 6$^a$, 6$^b$, 6$^c$, and 6$^d$. The form 6$^a$ is the same as that shown in Fig. 6, but without the serrations 6'. 6$^b$ is four-sided in cross section and takes the form of a segment of a circle. 6$^d$ is the same as the key 6$^b$ but is shorter. It is this form of key which is shown as being used in Fig. 10. 6$^c$ shows a round key of the form shown as being used in Fig. 17. Each one of these keys has its special advantages for different work. The triangular form is designed to bite in and crush the threads of the bolt. The four-sided form 6$^b$ has a comparatively large bearing surface but does not tend to cut into the bolt threads. This, however, might itself be made softer than the bolt threads so as to be bitten into by them. As this is held tightly between the washer 4 and the nut it cannot move, and being so guarded on either hand it cannot be accidentally displaced. In addition to this, the pressure of the key against the cam surface so tightens the nut and washers upon the bolt that any reverse movement of the cam washer except under considerable force is practically impossible. This pressure or engagement of the cam washer with the bolt is further increased by the fact that the threads of the bolt are slanting, while the washer must slack in a plane at right angles to the axis of the bolt.

In order to bind the cam washer more firmly into place when turned, I may provide the face of the cam adjacent to the nut 3 with a slightly raised outwardly inclined boss 5″ which corresponds and will fit in a shallow inclined depression 3″ in the face of the nut 3. When the recess 3' in the nut and the deepest part of the cam slot 5' are in alinement and the nut is unlocked, the boss 5″ and the depression 3″ are also in register, but when the cam washer is turned, the projection 5″ wedges out of depression 3″ and wedges against the face of the nut. Thus not only is the nut clamped to the bolt by the key 6, but the cam washer is jammed tightly between the nut and the washer 4. In addition to this, the projection of the boss 5″ into the depression 3″ when the nut is unlocked, acts to make of the nut and washer a unitary piece in that they will both move together as the nut 3 is turned up on the screw bolt. When, however, the nut 3 is held and the cam washer turned farther the boss slides out of the depression 3″ and jams the cam washer tightly in place as before described. It is to be understood, however, that I do not wish to be limited to the use of this boss and depression between the nut and cam washer as in many cases the mere contact of the face of the nut and washer would be sufficient to hold the washer from turning accidentally.

It will be seen from Figs. 11 and 12 that in the operation of locking and unlocking the key has a radial movement inward or outward to or from the bolt. If triangular keys are used there would be a tendency to turn if the key were supported in the rectangular recesses such as shown in Fig. 1, and thus the flat side of the key and not the apex might come in contact with the threads of the bolt. To avoid this I preferably form the recesses in the nut and washer 4 of the cross sectional form shown in Figs. 11 and 12. In this the bottom of the recess is rectangular but the upper part of the recess is gradually narrower in planes parallel to the triangular sides of the key. Thus while the key has sufficient radial movement to permit it to fully engage with the bolt as shown in Fig. 11 yet it is held from any lateral turning movement by reason of the converging sides of the recess. It will be seen from Fig. 12 that this form of recess leaves ample space above and around the key wherein a suitable rust-preventing paste may be carried.

In Figs. 13, 14 and 15 I show diametrically the means whereby I may positively unlock the key from its engagement with the bolt even when the key is rusted to the bolt. This result is achieved by forming the wide end of the slot 5' with a wedge-shaped projection 5‴ at the junction of the recess 5' with the bolt hole. The operation of this wedge-shaped projection is shown in the three figures. In Fig. 13 the key is in engagement with the threads of the bolt. In Fig. 14 the cam washer 5 has been turned around so as to bring its larger end against the key. The key, however, is still held in engagement with the threads of the bolt by reason of its being rusted in place or because of the crushing of the bolt threads into the substance of the key. It is necessary now to detach the key entirely from engagement with the bolt threads so that it may drop down into the bottom of the three recesses in the nut, the cam washer and the plain washer. A further turning of the cam washer 5 forces the wedge-shaped projection 5‴ against the upper side of the key and this portion, if continued will force the projection in between the key and the threads just as a wedge might be used to detach the key from the threads. It will be remembered, of course, that the key is held from any lateral movement by the nut and by the washer and hence that the wedge-shaped projection has a positive action on the key to detach it from its engagement with the bolt threads. This is a very important point in nut locks for unless some arrangement is made for this purpose rusting of the key in place absolutely prevents the disengagement of the nut lock and the bolt has to be cut off. With my device, while the nut is held perfectly solidly, yet the key may be readily detached by turning the cam washer reversely. It will be also noted from Figs. 13 to 16 that the wedge-shaped projection 5''' does not extend beyond the end wall of the cam recess so far as to prevent the end of the recess from engaging with the side of the key. This is particularly well shown in Fig. 15. Thus when the key has been forced out of engagement with the threads of the bolt the continued movement of the cam washer does not act to turn the key, and therefore possibly wedge it in the recesses in the nut and plain washer, but acts to hold the key in its proper position so that the cam washer and plain washer may all move together as a unit.

In Figs. 7, 8 and 9, I show another form of key designed more particularly for a cam washer such as is shown in Fig. 10 wherein the cam recess does not extend entirely through the washer. An enlargement of the key is shown in Fig. 8. As the key is not intended to extend through the cam washer it may be made comparatively flat. At one end it is formed with the triangular inwardly projecting tooth 7' and at its other end with the laterally projecting lug 7'' adapted to project inward into engagement with the recess 3' (in this case a small drill hole) of the nut 3. It is to be understood that only that portion of the key upon which the teeth 7' are mounted is carried in the cam slot, the portion 7'' alone entering the recess 3' of the nut 3.

In Fig. 10 I show a cross section of bolt provided with a nut 3 of the construction shown in Fig. 1 and with a cam washer 8 having the cam recess 8' on its inside face. The key shown as being used with this form of lock is also shown in detail at 6$^d$ Fig. 16. It will be seen that with this construction I do away with the washer 4 and that the key is entirely inclosed. Such a construction as this may not only be used in such positions as shown in Figs. 2 and 3 wherein the nut and its intermediate parts are intended to be screwed down upon a plate as A, but may be also used where a stop is desired to be formed upon a screw rod 2. The nut is screwed down upon the rod to the position desired and then the cam washer turned until the key is jammed into the threads of the screw. Thus the cam washer forms an abutment against which the nut bears preventing the nut from being turned farther down the rod and at the same time the key prevents the return of the nut up the rod.

I do not wish to limit myself to the construction shown in Figs. 7 and 9, to the form of key shown in Fig. 16, as I may use any form of flat key having any cross sectional form adapted to engage both with the cam recess and the recess in the nut 3, whether the same be round, rectilinear or triangular in shape.

In Figs. 4 and 5, in addition to the projection and recess 5'', 3'', I have shown another means of preventing the reversing of the cam washer. This consists in making the small extremity of the cam groove with a very slight cut out 5$^\times$ just large enough to receive the key when the cam washer has been turned to its full extent and to the position shown in Fig. 5. This cut out portion is so slight as not to withdraw the key from its engagement with the screw threads of the bolt but yet is sufficient to prevent the reversal of the cam washer and its movement backward relative to the key except under considerable force.

In Fig. 17 I have shown the nut as provided with a circular recess. This may be simply bored out of the nut by any ordinary tool. It is to be understood, of course, that a like recess is used in the plain washer 4. For use in the round recess the round key such as shown at $c$ Fig. 16 is used.

One of the advantages of my invention in all its forms resides in the fact that the key is entirely protected at all times from the weather or from intermeddling. In the construction shown in Figs. 2 and 3 the key is surrounded on all sides by the nut, the several washers and the plate against which the nut and washers are screwed, while in the construction shown in Fig. 10 the key is entirely inclosed within the nut and the cam washer and does not project out therefrom. This space formed by the recess in the washer and nut in all the forms of my invention is also of advantage in that it may be filled with material designed to prevent the rusting of the key such as grease, tar or paint. The space between the nut and washers may also be filled with paint or other protecting material. Thus the key is entirely insulated from moisture and protected from intermeddling, which is not the case where the key is exposed.

Another advantage of the invention lies in the fact that the screw threads of the bolt are not in any manner cut away or weakened and that only a very small portion of the screw threads of the nut are so cut away. This arises from the fact that the key does not project entirely through the nut, and only a very slight amount inward from its inner face. The key may also be made as narrow as desired so that practically the nut 3 has as much contact surface in engagement with the screw threads as the bolt has in the ordinary style of nut. The changes made as far as the nut is concerned are so slight that they do not in any manner interfere with the present practice in railways nor does my construction add to the cost of making the nuts.

I do not wish to be limited to the exact constructions which I have shown as there may be many minor changes made without departing from the spirit of my invention.

Having described my invention what I claim is:

1. In a nut lock, a bolt; a nut having an outer and inner flat contacting face and having a recess on its interior radial to the center of the nut and opening upon the inner face thereof; a locking washer surrounding the bolt and adapted to be placed between the nut and the body to which the bolt is attached, the inner circumference of said washer being unthreaded whereby it may be turned independently of the nut without longitudinal movement, said washer having a recess on its inner circumference gradually decreasing in depth from one end thereof to the other; and a key independent of either the nut or washer but adapted to extend into the recesses on the interior faces of both, the outer wall of the recess in the washer having a sliding contact with the key to force it radially inward into engagement with the threads of the bolt when the locking washer is turned independent of the nut.

2. In a nut-lock, a bolt; a nut; a locking washer; a key extending into recesses on the interior faces of both the nut and washer; the recess in said washer having a gradually decreasing depth from one end thereof to the other and having an end wall at its broadest portion adapted to contact with the key whereby when the nut is turned the washer shall be carried around with it, said end wall of the recess being provided with an inwardly projecting wedge-shaped portion adjacent to the inner face of the washer, which when the washer is turned reversely shall unseat the key from engagement with the bolt threads.

3. In a nut lock, a bolt; a nut; a locking washer; and a key extending into recesses on the interior faces of both the nut and washer, said key having converging sides, the recess in said washer having a gradually decreasing depth from one end thereof to the other and having an end wall at its broadest portion adapted to contact with the key whereby when the nut is turned the washer shall be carried around with it, said end wall of the recess being provided with an inwardly projecting wedge-shaped portion adjacent to the inner face of the washer which when the washer is turned reversely shall engage with the inclined side of the key to unseat the key from engagement with the bolt threads.

4. In a nut lock, a bolt; a nut having an outer and an inner flat contacting face and having a recess on its interior face radial to the center of the nut and opening upon the inner face thereof; a locking washer surrounding the bolt and adapted to be placed between the nut and the body to which the bolt is attached, the inner circumference of said washer being unthreaded whereby it may be turned independently of the nut without longitudinal movement, said washer having a recess on its inner circumference gradually decreasing in depth from one end thereof to the other; means whereby the nut and washer may be wedged apart from each other when the washer is turned into a locking position; and a key independent of either the nut or washer but adapted to extend into the recesses on the interior faces of both, the outer wall of the recess in the washer having a sliding contact with the key to force it radially inward into engagement with the threads of the bolt when the locking washer is turned independently of the nut.

5. In a nut-lock, a bolt; a nut; a locking washer; and a key extending into recesses on the interior faces of both the nut and washer, said key having two opposed converging sides meeting to form an edge adapted to engage with the threads of the nut, the recess in said washer having a gradually decreasing depth from one end thereof to the other, and the recess in the nut being deeper than the thickness of the key having parallel side walls at its outer portion and converging side walls at its inner portion adapted to contact with the converging sides of the key when the key is in engagement with the nut to prevent the turning of said key.

6. In a nut-lock, a bolt; a nut; a locking washer; and a key in engagement with both the nut and washer whereby the nut and washer are held together for a unitary turning movement in one direction; the washer having a recess on its interior circumference, said recess having a gradually decreasing depth from one end thereof to the other, the wall of said recess having sliding contact with the key to force it inward into contact with the threads of the bolt when the locking washer is turned independently of the nut; and a wedge-shaped projection on the face of the nut contacting with the face of the washer, said washer on its face having a recess for the accommodation of the wedge-shaped projection, said projection and recess being so located relatively to each other that when the nut-lock is in its unlocked position the projection will be received in said recess.

7. In a nut lock, a bolt; a nut; a locking washer in contact with the bolt, the contacting faces of the nut and washer being provided one with a wedge-shaped recess extending inwardly below the surface of the said face and the other with a wedge-shaped projection extending outwardly above the surface of the said face; and a key for engaging both the locking washer and the bolt to prevent the washer turning, adapted to be received in a recess when the washer is in its unlocking position but to be moved out of the said recess and wedge the nut and washer apart when the washer is locked on the bolt.

8. In a nut lock; a nut having a recess on its interior; and a locking washer having a recess on its interior, the wall of said recess being eccentric to the center of the washer; and a key independent of either nut or washer adapted to be received in said recesses of the nut and washer and to be forced into contact with the screw threads of the bolt when said washer is turned, said key being triangular in cross section along its whole extent, the base of said triangular key being adapted to be in contact with the eccentric wall of the washer recess.

9. In a nut lock, the combination with a nut recessed on its inside face, a key triangular in cross section adapted to rest in said recess, and an annular locking washer having a recess cut out of its inner circumference, said recess at one end being of a depth sufficient to accommodate the key and thence extending around the interior circumference of the washer, the depth becoming gradually shallower, the deeper end of said recess having an inwardly projecting wedge at its upper corner of greater angle than the side of said key and adapted to engage with the apex of the triangular key.

In testimony whereof, I have signed my name to this specification in the presence of two subscribing witnesses, this 12th day of April 1907.

FRANK A. BEARD.

Witnesses:
LEWIS COFFMAN,
J. H. TAGART.